United States Patent Office 3,755,373
Patented Aug. 28, 1973

3,755,373
SALTS OF 1-EPHEDRINE AND A D (—)-1-ALPHA-AZIDOFLUOROPHENYLACETIC ACID
Thore Oskar Verner Rydh, Sodertalje, Sweden, assignor to Astra Lakemedel Aktiebolag, Sodertalje, Sweden
No Drawing. Filed May 28, 1971, Ser. No. 148,181
Claims priority, application Sweden, June 2, 1970, 7,612/70
Int. Cl. C07c 117/00
U.S. Cl. 260—349          3 Claims

ABSTRACT OF THE DISCLOSURE

The process comprises reacting the DL-azidofluorophenylacetic acid in the form of a free acid or a salt thereof and 1-ephedrine or a salt thereof in a liquid reaction medium, in which process the 1-ephedrine is added in an amount of at most 0.6 mole/mole of DL-α-azidofluorophenylacetic acid, into the liquid reaction medium. A substance is added which increases the solubility of the salt of 1-ephedrine and the two optical isomers of α - azidofluorophenylacetic acid and thereby suppresses the precipitation of the 1-ephedrine salt of L(+)-α-azidofluorophenylacetic acid and which substance is selected from the group consisting of lower alkanols, ethers, lower esters, polyalcohols or impurities occurring in azidofluorophenylacetic acid of poor quality. Thereafter, the D(—) - α - azidofluorophenylacetic acid is selectively crystallized by the addition of seed crystals of this D(—)-α-azidofluorophenylacetic acid 1-ephedrine salt.

---

In my co-pending application Ser. No. 857,219, filed Sept. 11, 1969, now U.S. Pat. 3,681,400, I describe a new process for the preparation of the 1-ephedrine salt of D(—) - α - azidophenylacetic acid by reacting DL-azidophenylacetic acid with at most 0.6 mole/mole of DL-azidophenylacetic acid in the form of the free acid or salt thereof and 1-ephedrine or a salt thereof in a liquid reaction medium and in the presence of a substance which increases the solubility of the salt of 1-ephedrine and the two optical isomers of α - azidophenylacetic acid and thereby preferably suppresses the precipitation of the 1-ephedrine salt of L(+)-α-azidophenylacetic acid.

The present invention relates to new compounds useful as intermediates for the preparation of therapeutically valuable penicillins. The invention also relates to a new process for the preparation of these compounds.

More precisely the invention relates to salts of 1-ephedrine (I) and D(—) - α - azidofluorophenylacetic acid (II), and a new process for the preparation of these compounds.

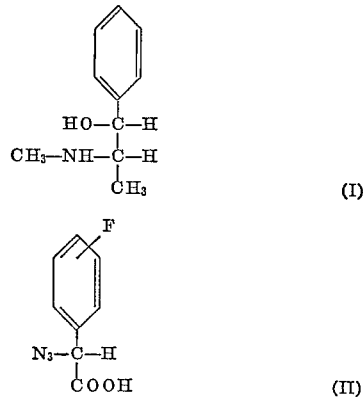

It is evident from the application Ser. No. 857,219 that the D(—) - epimer of α - azidophenylacetic acid, which according to known methods may be obtained from the above-mentioned amine salt, is used for the production of antibiotically active D(—) - α - azidobenzyl penicillin in industrial scale. The D(—)-epimer of α-azidophenylacetic acid is also used as starting material for the preparation of D(—) - α - aminophenylacetic acid which in its turn is used as a starting material for the preparation of ampicillin.

According to processes proposed heretofore 1 mole of azidophenylacetic acid is reacted with 1 mole of 1-ephedrine in preferably lower alcohols, whereafter the product is purified by recrystallization. This method has great technical and economical disadvantages. The azidophenylacetic acid is an unstable compound, which is easily decomposed during the evaporation of the alcoholic mother liquor which is undertaken during the recovery of 1-ephedrine and the racemization of the L(+)-enriched azidophenylacetic acid and the recovery of said acid. The recovery of ephedrine also involves losses.

The object of the present invention is to provide a process in which the above-mentioned disadvantages are avoided.

This and other objects are obtained according to the present invention if the reaction is carried out in a solvent or a system of solvents in which the ephedrine salt of the azidofluorophenylacetic acid is sparely soluble. The 1-ephedrine salt of D(—)-azidofluorophenylacetic acid in optically pure form may in this way be obtained in high yields if the amount of ephedrine is lowered from 1 mole/mole of acid to less than about 0.6 mole/mole and preferably to at most 0.5 mole of ephedrine/mole of acid. The amount of ephedrine in the mother liquor will in this case become very small and may also be recovered in very good yields by a simple extraction. At the same time the L(+)-azidofluorophenylacetic acid in the mother liquor may be racemized and recovered without any evaporation attended with losses.

Examples of applicable solvents are water, benzene, toluene, ligroin, trichloroethylene, ethyl acetate, pentanols and butanols.

Even if several different types of solvents and mixtures of solvents in principle may be useful, some are to be preferred for technical and economical reasons. The economy of the process depends not only on the factors earlier discussed but also on the productivity, expressed in, e.g. kg. of the product/m.³ of apparatus per hour as well as the costs for procedures and apparatus to eliminate risks of fire and explosion. Moreover, the reproducibility of the process is very essential which means that the probability of occurrence of batches of low quality, i.e. with low optical purity, should be very low.

The yield and the quality (the optical purity) are principally determined by the proportion mole of ephedrine/mole of azidofluorophenylacetic acid and the properties of the solvent. It has appeared according to the invention that water generally will meet most of the requirements of an optimal solvent. However, experiments show that the requirements of high reproducibility and productivity cannot be met by pure water. The reason is that the ephedrine salts of the two epimers are so sparely soluble in pure water that the probability of the precipitation of L(+)-azidofluorophenylacetic acid ephedrine salt is very high and once seed crystals of this form have formed the product will be optically strongly contaminated.

It has now according to the present invention been shown that this disadvantage with water as the solvent can be eliminated by the addition of solubilizing agents to the solvents in which the ephedrine salt is very sparely soluble. Such an addition improves the reproducibility and the optical purity to a substantial extent.

As solubilizing agent may be used impurities in azido-fluorophenylacetic acid of poor quality or compounds of the following types; lower alkanols, ethers with a molecular weight up to 300, e.g. dioxane, lower alkyl esters wherein the acid moiety contains up to 6 carbon atoms, e.g. ethyl acetate, and polyalcohols with molecular weights in the range from about 60 to about 190 and containing from 2 to 6 alcoholic groups per molecule, e.g. glycerol, that is compounds which have some but not unlimited solubility in the solvents from which the ephedrine salt will be crystallized.

Impurities in the poor quality azidofluorophenylacetic acid may be compounds, such as in the phenyl nucleus fluorosubstituted benzaldehyde, mandelic acid and phenylglyoxylic acid, which are found as impurities in the starting materials or which are formed by side reactions.

In a preferred embodiment water mixed with a lower alkanol e.g. isopropanol or a butanol, is used as the medium, but also other solvents will give good results as is shown by the subsequent specific examples, which illustrate the principles and practice of the instant invention.

It has been found that penicillins containing fluorine in the phenyl ring have properties in biological systems, which are from a medical point of view of greater interest than those which are not substituted with fluorine.

It has been found that D(—)-α-azido-m-fluorobenzylpenicillin is of special interest.

The value of a chemotherapeutic agent is determined by its antibacterial potency and by its pharmacological properties such as oral absorption, rate of excretion, and serum binding. A good oral absorption is a very desirable property as it makes it possible to obtain satisfactory blood concentrations of the chemotherapeutic agents by the more expedient oral route instead of by the more laborious and difficult parenteral route. Penicillins are bound to human serum protein in varying degrees and it has been found that their antibacterial activities diminish in proportion to their bindng to the protein (Robinson and Sutherland, Brit. J. Pharmacol. 25 (1965), 638). Kunin (Clinical Pharmacology and Therapeutics 7 (1966), 166) has found that extensive binding of penicillins to serum markedly inhibits their antibacterial activity in serum and that the level of unbound drug more truly reflects the antimicrobial activity of the compound as determined in customary in vitro assays.

Although 6-[D-α-azidophenylacetamido] penicillanic acid is absorbed by the oral route quite appreciably (L. Magni et al. Antibiotics and Chemotherapy 1967, p. 569) it has been found that the introduction of a fluorine atom into the benzene ring of the side chain surprisingly leads to compounds which give still much better blood levels after oral administration.

When 6 - [-α-azido-fluorophenylacetamido]-penicillanic acids were administered orally to mice all compounds were absorbed considerably better than 6-[D-α-azido-phenylacetamido]-penicillanic acid. With m- and p-substituted compounds blood levels at least twice as high as those found with the unsubstituted compound were obtained. Longer duration of the blood levels was also observed.

When 6-[(—)-α-azido-m-fluorophenylacetamido]-penicillanic acid was administered to humans peak levels of the same order as those of 6-[D-α-azido-phenylacetamido]-penicillanic acid were found. From two hours after the administration, however, the blood levels obtained with the fluoro compound were considerably higher than those obtained with the unsubstituted compound. Even eight hours after the administration therapeutically useful blood levels were found with the former whereas the latter gave such levels only for six hours. When 300 mg. of the sodium salt of each compound were given, the blood levels of 6 - [(—) - α-azido-m-fluorophenylacetamido]-penicillanic acid after eight hours were in fact significantly higher than those found with 6-[D-α-azido-phenylacetamido]-penicillanic acid after six hours.

These high and prolonged blood levels are of great therapeutic and pharmaceutic value as they make it possible to reduce the doses of the compound which must be given to achieve a therapeutic effect and/or to change the dosage regimen so that fewer administrations of the drug can be made.

The antibacterial activity of 6-[-α-azido-fluorophenylacetamido]-penicillanic acids is of the same order as that of the unsubstituted compound. As in the case of the latter the fluoro-substituted penicillins which originate from levorotatory side chain acids are more active than their epimers obtained from the dextrorotatory acids.

6 - [-α-azido-fluorophenylacetamido]-penicillanic acids are bound to human serum to about the same degree as 6 - [D-α - azido-phenylacetamido]-penicillanic acid. Some of the compounds are bound slightly more and some slightly less than the latter.

Compared to the unsubstituted α-azidobenzylpenicillin, the unchanged antibacterial and serum binding properties of the 6-[-α-azidofluorophenylacetamido]-penicillanic acids in conjunction with their unexpectedly much higher and more prolonged blood levels after oral administration thus make them therapeutically more efficient compounds.

Other analogues of 6-[D-α-azido-phenylacetamido]-penicillanic acid which are halogen-substituted in the benzene ring might possibly also give enhanced blood levels after oral administration. Their use as therapeutic agents are, however, precluded by their extensive binding to human serum. α-azido-m-chlorobenzylpenicillin and α-azido-p-chlorobenzylpenicillin, for example, are bound to human serum to the extent of 98.0% and 96.5%, leaving only 2.0% and 3.5% respectively, of the penicillins in free, active form.

The D(—)-α-azido-fluorophenylacetic acids which are required for the synthesis of the corresponding D(—)-azido-fluorobenzylpenicillins can be prepared according to the method described for the non-fluorosubstituted compound in our co-pending application Ser. No. 857,219. All the advantages of this method exist also in this case.

The following examples illustrate the procedure.

EXAMPLE 1

45 g. of azidophenylacetic acid were dissolved in 225 ml. of water containing an equivalent amount of sodium hydroxide. The solution was diluted with 45 g. of isopropanol.

While stirring 19.5 g. of 1-ephedrine hydrochloride (37 mole percent) dissolved in 95 ml. of water were added uniformly over 3 hours. When about 5% were added inoculation was carried out using optically pure D(—)-α-azidophenylacetic acid ephedrine salt. After the addition of ephedrine hydrochloride stirring was continued for one more hour whereafter the substance was filtered off and washed with 25 ml. of water.

Yield: 56% of the D-acid of the DL-acid charged.
Optical purity: 98%.

EXAMPLE 2

45 g. of azidophenylacetic acid were dissolved in 225 ml. of trichloroethylene mixed with 12 ml. of isopropanol and 15 g. of triethylamine at about 35° C. While stirring, a solution of 16 g. of ephedrine base (37 mole percent) dissolved in 95 ml. of trichloroethylene was added uniformly over 2 hours. During this addition inoculation was performed now and then using optically pure ephedrine salt until the seed remained undissolved. The mixture was cooled while stirring was continued and the substance which crystallized was filtered off and washed with ice-cooled trichloroethylene.

Yield: 50% calculated on the D-acid of the DL-acid charged.
Optical purity: 94%.

Yield and optical purity at different additions to the water with an amount of ephedrine of 0.37 mole/mole of acid is evident from Table I which also shows the results which were obtained with solvents other than water. From the table it is also seen that with an added amount of isopropanol which is equal to the amount of azidophenylacetic acid (about 10–15% of isopropanol in the solvent) very good results from the technical and industrial point of view were obtained when using water as the crystallization agent. It may also be pointed out that an aqueous sysem is to be preferred also from the standpoint of high productivity, reproducability and safety and because ephedrine normally is sold in the form of a salt and is easily recovered in that form. Moreover, a process in which D(—)-α-azido-phenylacetic acid is enriched from the racemic mixture in aqueous surroundings makes it possible to use those aqueous solutions of salts of azidophenylacetic acid which are most commonly obtained in the synthesis of this compound.

Table 1

Yield and optical purity of the 1-ephedrine salt of D(—)-α-azidophenylacetic acid with the addition of 0.37 mole of 1-ephedrine/mole of azidophenylacetic acid.

| Solvent solubilizing agent | | Yield | | |
|---|---|---|---|---|
| Kind | Concentration, percent weight/weight | Salt calculated on added amount of D(—)-α-azidophenylacetic acid in the form of racemate, percent | Ephedrine calculated from added amount of ephedrine, percent | Optical purity, percent |
| Water | | [1] 40–70 | (1) | [1] 50–90 |
| Water isopropanol | 4.2 | 66 | 89 | 83 |
| Do | 6.6 | 60 | 81 | 94 |
| Do | 9.6 | 58 | 79 | 95–100 |
| Do | 12 | 56 | 76 | 98–100 |
| Water butanol | 1.2 | 66 | 89 | 83 |
| Do | 3 | 60 | 81 | 93 |
| Do | 4.8 | 57 | 78 | 97 |
| Water dioxane | 6.6 | 56 | 76 | 96 |
| Water ethyl acetate | 6.6 | 52 | 70 | 97 |
| Water glycerol | 6.6 | 63 | 85 | 91 |
| Trichlorethylene | | 50 | 68 | 90 |
| Trichlorethylene isopropanol | 3 | 40 | 54 | 93 |
| Benzene isopropanol | 3 | 50 | 68 | 94 |
| Ligroin n-butanol | 6 | 45 | 55 | 88 |

[1] Varying.

By the processes earlier described which use repeated recrystallizations, an optical purity of 90% at a maximum yield of 65% calculated on ephedrine could be obtained. It may be seen from the table that higher optical purities and yields calculated on ephedrine may be obtained according to the single stage process of the present invention than according to the known processes.

EXAMPLE 3

A solution of DL-α-azido-m-fluorophenylacetic acid was prepared using 600 g. (3.07 mole) of acid, 3 l. of water, sodium hydroxide (3.07 mole) and 430 ml. of isopropanol. While stirring, a solution of 232 g. (1.15 mole) of 1-ephedrine hydrochloride in 1000 ml. of water was added over about half an hour. At temperatures above room-temperature a clear solution is obtained. At lower temperatures a crystallinic precipitation is rapidly obtained. At the end of the addition inoculation was carried out using optically pure D(—)-α-azido-m-fluorophenylacetic acid 1-ephedrine salt until the seed remained undissolved. Stirring was then continued overnight. The temperature had then fallen to about 18° C. The crystals were filtered off, were washed with 400 ml. of water and were allowed to dry in vacuum.

Yield D-acid: 58% of the D-acid of the DL-acid charged.
Optical purity: 96%
Yield ephedrine: 77.5% of the ephedrine hydrochloride charged.

I claim:
1. D(—)-α-azido-o-fluorophenylacetic acid 1-ephedrine salt.
2. D(—)-α-azido-m-fluorophenylacetic acid 1-ephedrine salt.
3. D(—)-α-azido-p-fluorophenylacetic acid 1-ephedrine salt.

References Cited
UNITED STATES PATENTS 3,367,948    2/1968    Gapp et al. _____ 260—349
3,470,233    9/1969    Bohn et al. _____ 260—349

JOHN M. FORD, Primary Examiner

U.S. Cl. X.R.
260—256.5; 424—246